United States Patent [19]

Lobanoff et al.

[11] E Patent Number: Re. 33,631

[45] Reissued Date of Patent: Jul. 9, 1991

[54] SPRING-LOADED HINGE ASSEMBLY FOR VEHICLE ACCESSORIES

[75] Inventors: Mark Lobanoff, Bloomfield Hills; James A. Gavagan, Centerline, both of Mich.

[73] Assignee: Takata Inc., Auburn Hills, Mich.

[21] Appl. No.: 458,190

[22] Filed: Dec. 28, 1989

Related U.S. Patent Documents

Reissue of:

[64] Patent No.: 4,796,944
Issued: Jan. 10, 1989
Appl. No.: 138,314
Filed: Dec. 28, 1987

U.S. Applications:

[62] Division of Ser. No. 910,129, Sep. 22, 1986, Pat. No. 4,715,644.

[51] Int. Cl.[5] ..... B60J 3/00

[52] U.S. Cl. ..... 296/97.5; 16/267; 16/341

[58] Field of Search ..... 296/97.1, 97.5, 97.11, 296/97.12, 97.13, 97.8, 97.9; 362/137; 16/267, 277, 225, 341, 293, 296, 297, 303; 297/191, 410

[56] References Cited

U.S. PATENT DOCUMENTS

| | | | |
|---|---|---|---|
| 325,006 | 8/1885 | Neeley | 297/185 |
| 1,026,706 | 5/1912 | Sears | 297/185 |
| 1,893,458 | 1/1933 | Tatum | 297/191 |
| 1,894,233 | 1/1933 | Ellis | 296/97.1 |
| 1,905,868 | 4/1933 | Hein | 350/283 |
| 2,118,198 | 5/1938 | Hathaway | 296/97.8 |
| 2,231,641 | 2/1941 | Schwab | 296/97.8 |
| 2,818,298 | 12/1957 | Goeske | 297/97.8 |

(List continued on next page.)

FOREIGN PATENT DOCUMENTS

| | | | |
|---|---|---|---|
| 53663 | 1/1981 | European Pat. Off. | 296/97.1 |
| 61622 | 3/1982 | European Pat. Off. | 296/97.1 |
| 1143365 | 10/1957 | Fed. Rep. of Germany | 296/97.1 |
| 1032112 | 6/1958 | Fed. Rep. of Germany | 296/97.1 |
| 2027386 | 12/1971 | Fed. Rep. of Germany | 296/97.1 |
| 3118267 | 6/1982 | Fed. Rep. of Germany | 296/97.1 |
| 443964 | 2/1968 | Switzerland | 296/97.1 |
| 817159 | 7/1959 | United Kingdom | 296/97.1 |
| 854938 | 11/1960 | United Kingdom | 296/97.1 |
| 999331 | 7/1965 | United Kingdom | 296/97.1 |
| 1043087 | 9/1966 | United Kingdom | 296/97.1 |
| 1214327 | 12/1970 | United Kingdom | 296/97.1 |

*Primary Examiner*—Robert R. Song
*Attorney, Agent, or Firm*—Harness, Dickey & Pierce

[57] ABSTRACT

A hinge assembly is disclosed which is particularly well suited for vehicle accessory applications, such as for pivotally interconnecitng vanity doors with vanity housing structures for example. The hinge assembly, which is also applicable for other applications, includes a pivot means pivotally interconnecting first and second members for relative rotational movement about a longitudinal axis, with a cam on the first member protruding in a generally lateral direction to engage a resilient biasing means on the second member. The resilient biasing means, which is preferably a leaf spring, is slidably engaged and resiliently deflected by the cam on the first member and exerts a resilient biasing force on the cam in a generally lateral direction, generally toward the pivot axis. The cam preferably includes one or more dwell portions such that the spring or other resilient biasing means tends to resiliently and releasably maintain the first and second members in one or more predetermined relative rotational orientations when engaged by the dwell portions on the cam.

21 Claims, 4 Drawing Sheets

U.S. PATENT DOCUMENTS

| | | | |
|---|---|---|---|
| 3,159,421 | 12/1964 | Samuelson | 296/97.8 |
| 3,211,903 | 10/1965 | McElreath | 240/4.2 |
| 3,305,679 | 2/1967 | Barcita-Peruchina | 240/6.45 |
| 3,543,416 | 11/1970 | Nelson et al. | 296/97.1 |
| 3,550,187 | 12/1970 | Swartz | 16/180 |
| 3,605,175 | 9/1971 | Wilson | 16/184 |
| 3,795,422 | 3/1974 | Robinson et al. | 297/191 |
| 3,842,463 | 10/1974 | Wehner | 16/142 |
| 3,926,470 | 12/1975 | Marcus | 296/97.1 |
| 4,000,404 | 12/1976 | Marcus | 296/97.1 |
| 4,070,054 | 1/1978 | Cziptschirsch | 296/97.11 |
| 4,075,468 | 2/1978 | Marcus | 296/97.1 |
| 4,174,864 | 11/1979 | Viertel et al. | 296/97.1 |
| 4,178,035 | 12/1979 | Cziptschirsch | 296/97.1 |
| 4,203,194 | 5/1980 | Viertel et al. | 296/97.1 |
| 4,213,169 | 7/1980 | Kempkers | 362/74 |
| 4,280,730 | 7/1981 | Turner | 296/97.8 |
| 4,352,519 | 10/1982 | Aro | 296/97.8 |
| 4,363,511 | 12/1982 | Viertel et al. | 296/97 K |
| 4,363,512 | 12/1982 | Marcus | 296/97.11 |
| 4,378,129 | 3/1983 | Kaiser et al. | 296/97.11 |
| 4,417,761 | 11/1983 | Cziptschirsch | 296/97.11 |
| 4,421,355 | 12/1983 | Marcus | 296/97.1 |
| 4,469,367 | 9/1984 | Kuttler et al. | 296/97.11 |
| 4,541,663 | 9/1985 | Schwanitz et al. | 296/97.1 |
| 4,591,956 | 5/1986 | Majchrzak | 362/144 |

FIG. 1.
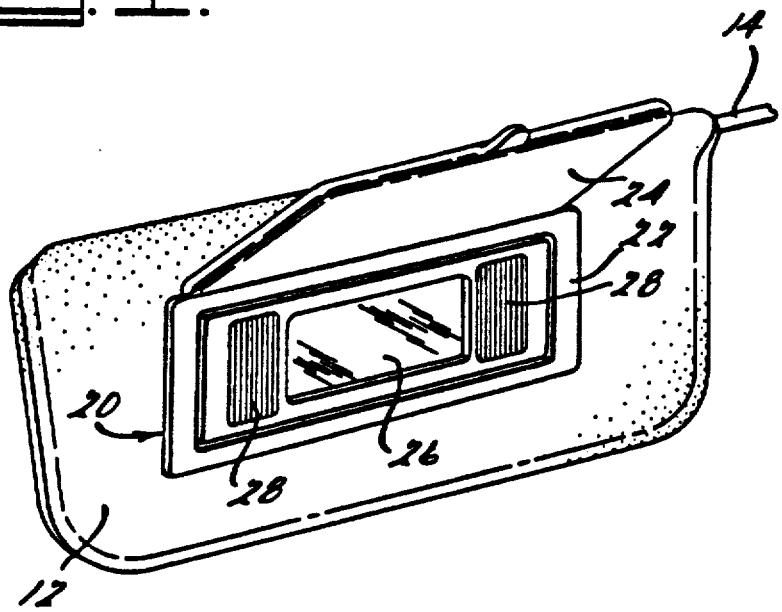
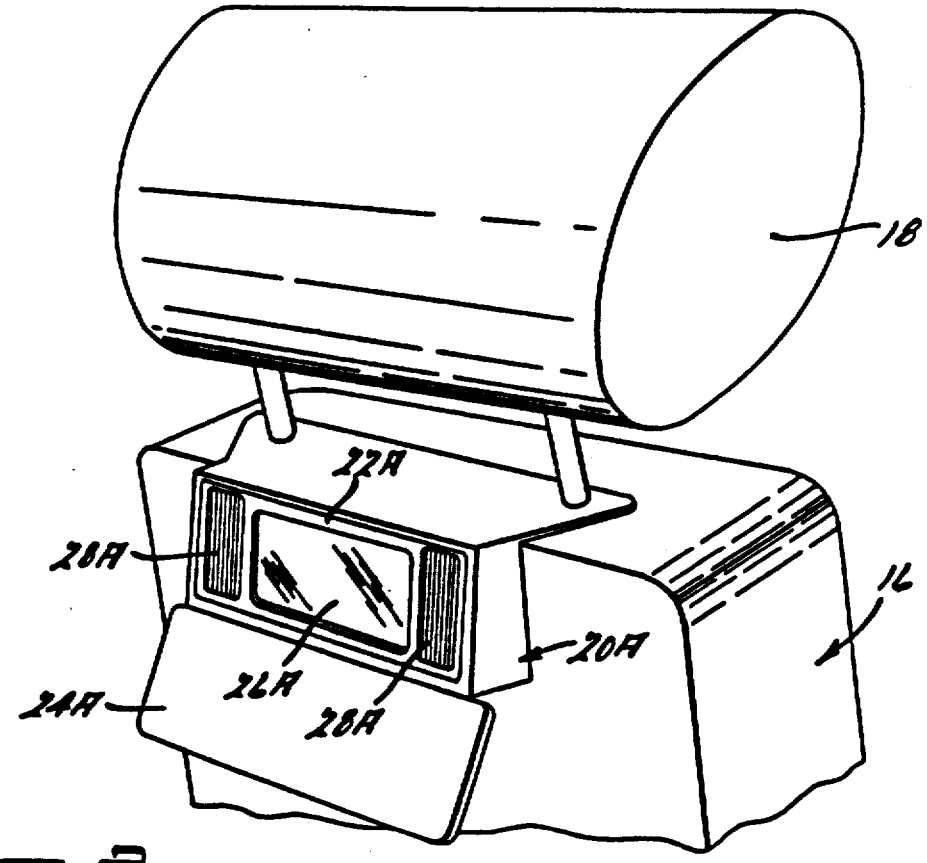
FIG. 2.

SPRING-LOADED HINGE ASSEMBLY FOR VEHICLE ACCESSORIES

Matter enclosed in heavy brackets [ ] appears in the original patent but forms no part of this reissue specification; matter printed in italics indicates the additions made by reissue.

This is a division of U.S. patent application Ser. No. 910,129, filed Sept. 22, 1986, now U.S. Pat. No. 4,715,644.

BACKGROUND AND SUMMARY OF THE INVENTION

The present invention relates generally to hinge assemblies for hinged or pivotally interconnected members, and more particularly to such hinge assemblies especially adapted for pivotally interconnecting a vehicle accessory door with a vehicle accessory housing structure or other portion of the interior of a vehicle. Such vehicle accessory doors include vanity doors, storage compartment doors or other accessory covers. Hinge assemblies according to the present invention can also be employed for various non-vehicular uses, as will be readily appreciated by one skilled in the art from the following discussion.

The typical vehicle includes a wide variety of hinged or pivotally mounted vehicle accessories or accessory covers in the interior, luggage storage areas, engine compartment, or other areas. In the past, however, many hinge assemblies for such vehicular applications, as well as those for various non-vehicular applications, either have not been sufficiently durable or have been relatively expensive to produce and install. Furthermore, many of such prior hinge assemblies have been found to be inordinately bulky, unsightly, or ill-fitting, all of which detract from the user's perception of quality with regard to the vehicle or other device in which such hinge assemblies are included.

In addition to the above disadvantages, many prior hinge assemblies have not provided the user with relatively rotated or pivoted positions in which the hinged members can be held and maintained especially after extended use and wear of the hinge components. One example of the prior art wherein such a feature has been provided, however, is an over-center, spring-and-lever arrangement, such as that shown in U.S. Pat. Nos. 4,491,899; 4,227,242; and 4,000,404. Another example is an arrangement having a coil spring with its opposite ends interconnected with opposite hinged members in order to bias the two hinge members toward one another in a mutual sliding arrangement. This hinge arrangement does not have a pivot pin or other member pivotally interconnecting the hinged members and thus the spring functions both as a resilient biasing member for resiliently biasing the hinged members toward one another and as a "fastener" for securing the hinged members together. These arrangements have been found to have various disadvantages in terms of durability, performance, complexity, or expense of manufacture. The need has therefore arisen for a hinge assembly of the type described herein, which is simple and inexpensive to produce, assemble and install, that is highly durable, and that is capable of maintaining the hinged member in one or more relative rotational or pivotal orientations, such as in open and closed positions, for example.

According to the present invention, a spring-loaded hinge assembly is provided for interconnecting first and second relatively rotatable members in a hinged relationship with respect to one another. Such a hinge assembly includes a pivot pin or other pivot means for pivotally interconnecting the first and second members for relative rotational movement about a generally longitudinally-extending axis and a cam protruding in a generally lateral direction from one of the first or second members for rotational relative movement therewith. A spring or other resilient biasing means on the other of the first or second members is slidably engaged and resiliently deflected by the cam in order to exert a resilient biasing force on the cam in a generally lateral direction generally toward the longitudinal axis, thus tending to bias the hinged members generally in opposite directions away from one another. Preferably, the resilient biasing means includes a leaf spring secured to one of the first or second members, with the leaf spring being laterally and resiliently deflected by the cam on the other member during at least a portion of the rotational movement of the member.

Preferably, the above-mentioned cam has at least one dwell portion thereon for engaging the leaf spring or other resilient biasing means at a corresponding predetermined, relative rotational orientation of the first and second members with respect to one another. In such an arrangement, the resilient biasing means tends to resiliently and releasably maintain the first and second members in the predetermined relative rotational orientation when engaged by the dwell portion of the cam.

In still another preferred hinge arrangement according to the present invention, the cam can have at least a pair of the dwell portions thereon, with a laterally-enlarged lobe portion disposed between the dwell portions. In this arrangement, the dwell portions engage the resilient biasing means at a corresponding pair of predetermined relative rotational orientations of the first and second members, such as in preselected open and closed orientations for example, in order to resiliently and releasably maintain the first and second members in each of the predetermined orientations. Preferably the resilient biasing means is resiliently and laterally deflected by the cam to a greater extent when engaged by the laterally-enlarged lobe portion of the cam than when engaged by either of the dwell portions of the cam, and the laterally-enlarged lobe portion of the cam has a rounded configuration. This preferred arrangement causes the resilient biasing means to tend to forcibly urge or "self-propel" the first and second members into one of the predetermined relative rotational orientations when the resilient biasing means is engaged by the rounded and laterally-enlarged lobe portion of the cam.

In specific applications of the hinge assembly described above, the cam can be disposed on an accessory door for rotational movement therewith relative to an accessory housing structure. In such an arrangement, the leaf spring or other resilient biasing means is disposed on the housing structure for engagement with the cam on the door, as explained above. Alternately, the cam can be disposed on the housing structure, and the leaf spring or other resilient biasing means can be disposed on the accessory door for rotational movement therewith relative to the housing structure. In any of the embodiments discussed above, a first movable member is hinged or pivotally interconnected with a fixed or movable second member and is preferably resiliently urged and substantially self-propelled into one of the above-mentioned predetermined rotational orientations relative to the second member whenever the hinged components are moved to relative rotational orientations in close proximity with one of the predetermined relative rotational orientations at which the cam dwell portion or portions engage the leaf spring or other resilient biasing means.

Additional objects, advantages and features of the present invention will become apparent from the following description and appended claims, taken in conjunction with the accompanying drawings.

BRIEF DESCRIPTION OF THE DRAWINGS

FIG. 1 is a perspective view of an exemplary visor assembly for the interior of a vehicle, with the visor having a vanity assembly and a hinge assembly according to the present invention for pivotally interconnecting the vanity door with the vanity housing structure.

FIG. 2 is a partial perspective view of an exemplary vehicle seat having a vanity assembly on the rear side thereof, with a hinge assembly according to the present invention pivotally interconnecting the vanity door with the vanity housing structure.

FIG. 9 is a cross-sectional view taken generally along line 9—9 of FIG. 7.

FIG. 10 is a cross-sectional view taken generally along line 10—10 of FIG. 7.

FIG. 11 is a cross-sectional view taken generally along line 11—11 of FIG. 7.

FIG. 12 is a cross-sectional view taken generally along line 12—12 of FIG. 7, with the vanity door shown in a closed position.

FIG. 13 is a cross-sectional view similar to FIG. 12A, but showing the vanity door rotated to an open position.

FIG. 14 is a cross-sectional view taken generally along line 14—14 of FIG. 12.

DETAILED DESCRIPTION OF THE PREFERRED EMBODIMENTS

Figure 8:
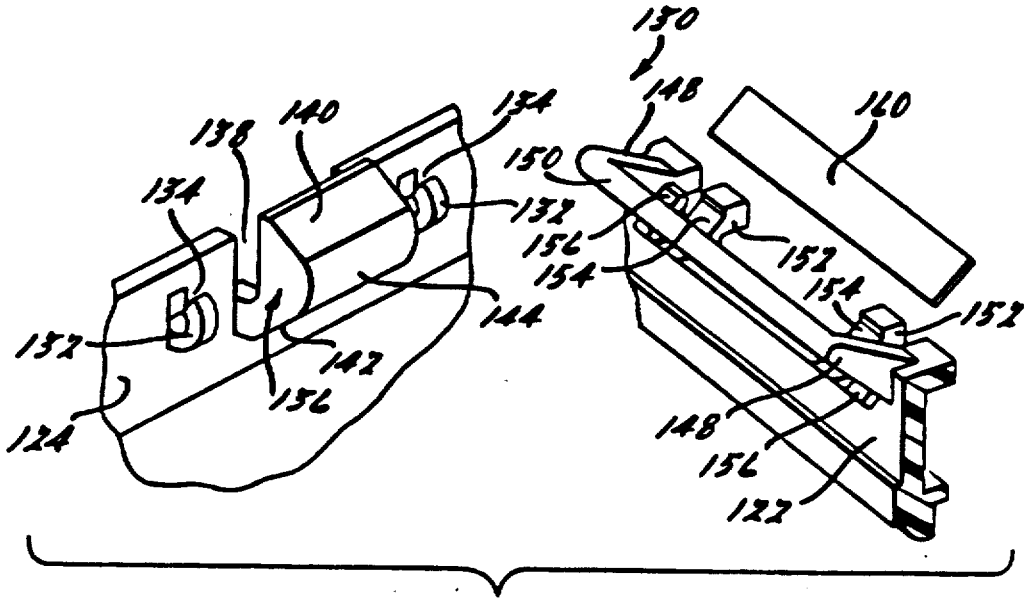
FIG. 8 is a partial exploded perspective view of the hinge portion of the vanity assembly of FIG. 7.
Figure 7:
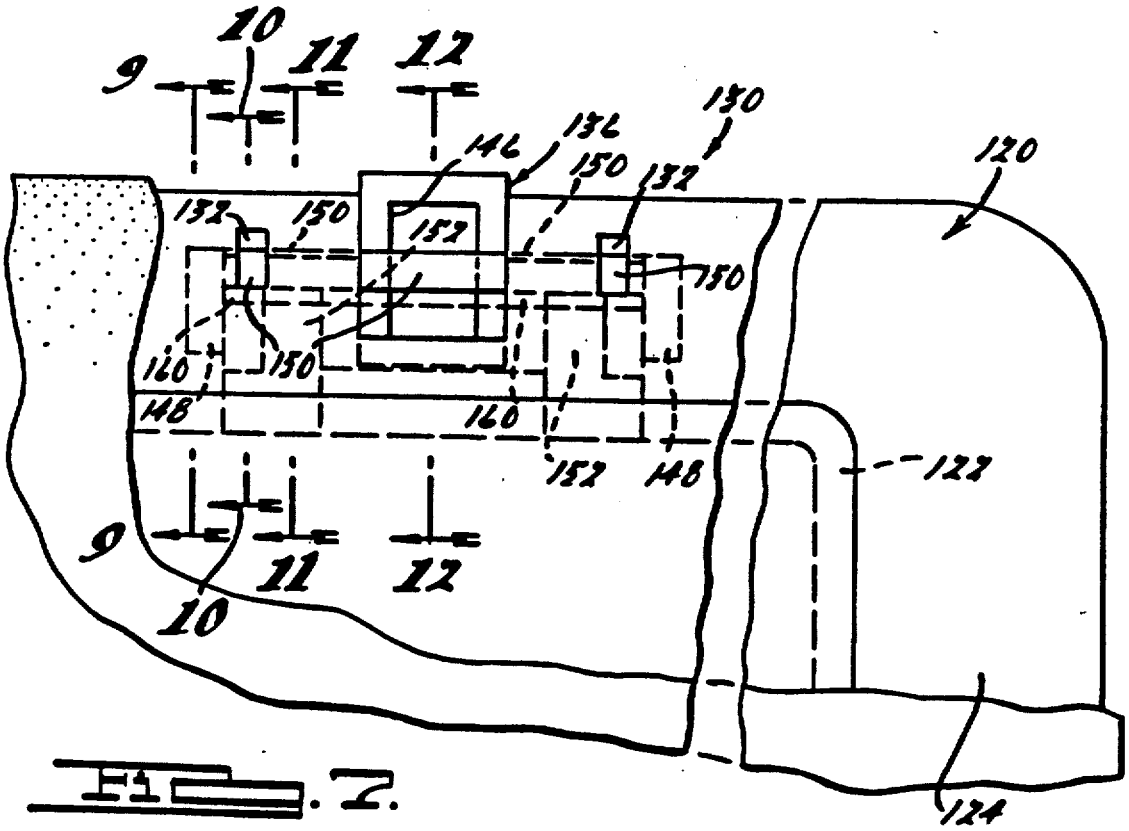
FIG. 7 is a partial view of an alternate vanity assembly, similar to that of FIG. 1, in a closed position with portions broken away to reveal the components of an alternate hinge assembly.
Figure 3:
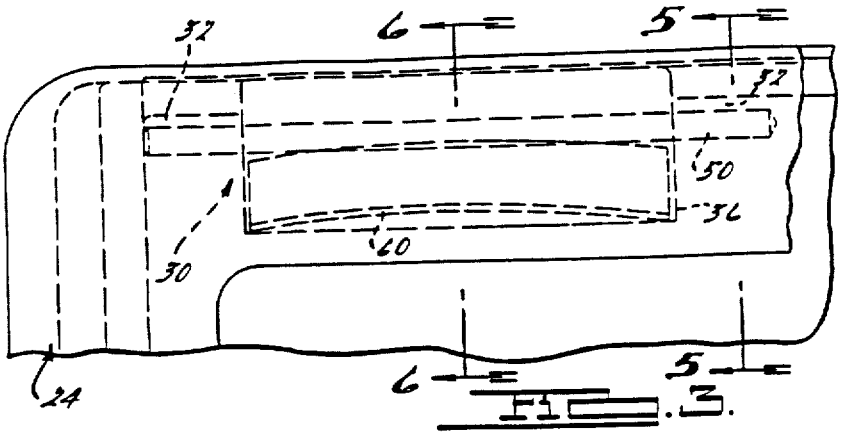
FIG. 3 is a partial view of a preferred vanity assembly of FIG. 1, in a closed position, showing the hinge assembly in hidden lines.
Figure 4:
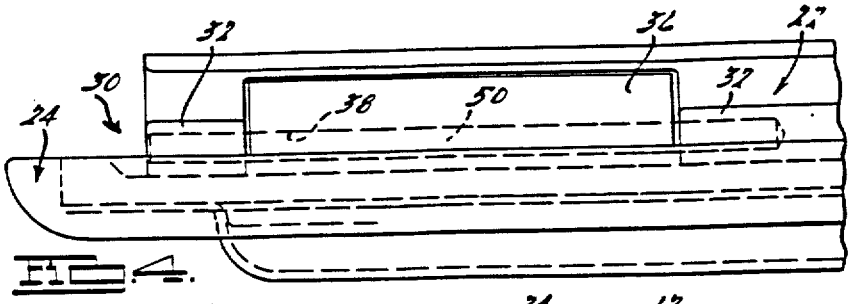
FIG. 4 is a partial top view of the assembly of FIG. 3.
Figure 5:
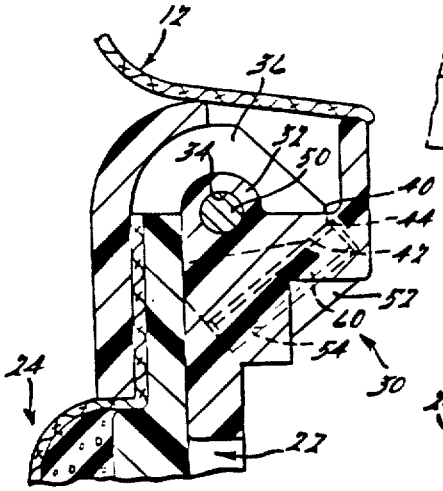
FIG. 5 is a cross-sectional view taken generally along line 5—5 of FIG. 3.
Figure 6:
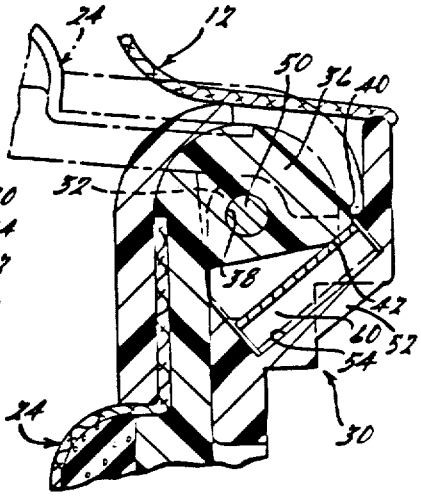
FIG. 6 is a cross-sectional view taken generally along line 6—6 of FIG. 3.

FIGS. 1 through 14 illustrate various embodiments of hinge assemblies according to the present invention, which are shown incorporated in an exemplary application for a vanity door of a vanity assembly on one side of a vehicle sun visor, as well as illustrating a similar vanity assembly for the rear side of a vehicle seat. One skilled in the art will readily recognize from the discussion, claims and drawings herein, however, that the principles of the present invention are equally applicable to hinge assemblies other than those shown in FIGS. 1 through 14, as well as in other vehicular or non-vehicular applications.

FIG. 1 illustrates an exemplary sun visor 12 pivotally interconnected with a pivot rod 14 adapted for mounting in the interior of a vehicle (not shown). A vanity assembly 20 is mounted on one side of the sun visor 12 and includes a vanity housing 22 and a hinged vanity door 24 for enclosing a mirror 26 and illumination lights 28, for example.

In FIG. 2, a vehicle seat 16 includes a head restraint 18 interconnected therewith, with a vanity assembly 20A mounted on the rear side of the vehicle seat 16. The exemplary vanity assembly 20A includes a vanity housing 22A and a hinged vanity door 24A for enclosing a mirror 26A and illumination lights 28A, or other such vehicular accessories. The vanity assemblies 20 and 20A shown in FIGS. 1 and 2, respectively, are merely illustrative examples of suitable applications for one or more hinge assemblies according to the present invention for hingedly or pivotally interconnecting the vanity doors 24 and 24A with the vanity housings 22 and 22A, respectively. One preferred embodiment of such a hinge assembly according to the present invention is shown in FIGS. 3 through 6 and is described in more detail below.

FIGS. 3 through 6 illustrate various detailed views of hinge assembly 30 for hinged or pivotal interconnection of the vanity door 24 with the vanity housing 22, of FIG. 1. It should be noted that one or more of the hinge assemblies 30 can also be used for hinged or pivotal interconnection of the vanity door 24A with the vanity housing 22A in FIG. 2, as well as in the other vehicular or non-vehicular applications.

The exemplary hinge assembly 30 includes one or more pivot bearing numbers 32 interconnected or integrally formed with the vanity door 24 and having open portions 34 for insertion of a pivot rod or pin 50. A cam member 36 is also interconnected or integrally formed with the vanity door 24 and includes an open portion 38 for receiving the pivot rod or pin 50 extending longitudinally between the pivot bearing members 32. The cam member 36 preferably includes one or more dwell portions 40 and 42 and a lobe portion 44. The pivot pin 50, which extends in a generally longitudinally direction, is received within the open portions 34 and 38 of the pivot bearing members 32 and the cam member 36, respectively, in order to hingedly and pivotally interconnect the vanity door 24 with the vanity housing 22. Although the exemplary hinge assembly 30 is preferably composed of a molded synthetic or plastic material, it should be noted that the various components of the hinge assembly 30 can alternately be composed of other suitable materials, and can be constructed by other methods, as will be appreciated by one skilled in the art.

It should be noted that the single pivot pin 50 shown in the exemplary embodiments of the hinge assembly 30 depicted in the drawings can be replaced by two or more pivot pins, each of which being received in one of the bearing members 32. In such an arrangement, wherein a pair of pivot pins are disposed on opposite sides of the cam member 36 in lieu of the single pivot pin 50 shown in the drawings, the open portion 38 of the cam member 36 can be eliminated if desired.

The vanity housing 22 of the preferred exemplary hinge assembly 30 also includes a spring support portion 52, having a spring seat 54 thereon, for receiving and slidably retaining a leaf spring 60 extending in a generally longitudinal direction. In the hinge assembly 30 depicted in the drawings, the leaf spring 60 is generally unsupported in a medial portion between the associated spring seats 54 at opposite ends of the leaf spring 60. Thus, when the hinge assembly 30 is assembled, the leaf spring 60 is slidably engaged and resiliently deflected by the cam member 36 during pivotal rotational movement of the vanity door 24 relative to the vanity housing 22. The deflected leaf spring 60 exerts a resilient biasing force on the cam member 36, and thus slides longitudinally outwardly against the spring seats 54, in a generally lateral direction, generally toward the longitudinal axis of rotation extending through the pivot pin 50, and thus also tends to resiliently bias the vanity door 24 and the vanity housing 22 in generally opposite directions away from one another.

The leaf spring 60 functions to resiliently but releasably maintain the vanity door 24 in predetermined rotational orientations relative to the vanity housing 22 when the leaf spring 60 is engaged by the dwell portions 40 and 42 of the cam member 36. The laterally-enlarged lobe portion 44 of the cam member 36 preferably has either the narrow intersection of the dwell portions 40 and 42 shown in FIGS. 5 and 6, or an optional rounded or arcuate shape, confronting the leaf spring 60. Thus, the resilient biasing force of the leaf spring 60 tends to resiliently and forcibly urge or self-propel the vanity door 20 toward or into one of such predetermined rotational orientations relative to the vanity housing 22 when the leaf spring 60 is engaged by the laterally-enlarged lobe portion 44. This effect results primarily from the fact that the leaf spring 60 is preferably resiliently deflected in a lateral direction to a greater extent when engaged by the lobe portion 44 than when engaged by either of the dwell portions 40 or 42.

As a result of the arrangement discussed above, when the vanity door 24 is manually rotated to rotational orientations in relatively close proximity to the predetermined relative rotational orientations corresponding to the positions of the dwell portions 40 and 42, the resilient biasing force of the leaf spring 60 tends to self-propel the vanity door portion into such predetermined relative rotational orientations. Although such relative rotational orientations correspond to open and closed positions of the vanity door 24 in the hinge assembly 30 depicted in the drawings, one skilled in the art will readily appreciate that the dwell portions of the cam member in any given application can be preselected to result in any number of other predetermined relative rotational orientations.

In addition to the above, it should also be noted that although the exemplary hinge assembly 30 depicted in the drawings includes the cam member 36 and the pivot bearing members 32 on the vanity door 24, with the pivot pin 50, the leaf spring 60, and the related supporting components on the vanity housing 22, one skilled in the art will readily appreciate that this arrangement can alternately be reversed. In such a reversed arrangement, the cam member 36 and the pivot bearing members 32 would be disposed on the vanity housing 22, while the pivot pin 50, the leaf spring 60, and related supporting components would then be disposed on the vanity door 24. For purposes of convenient reference and simplicity of the drawing figures, such reversed arrangement has not been explicitly shown in the drawings, but the configuration of the hinge components would be substantially identical to that shown in the drawings in connection with the exemplary hinge assembly 30.

FIGS. 7 through 14 illustrate various detailed views of an alternate exemplary hinge assembly 130 for hinged or pivotal interconnection of a vanity door 124 with a vanity housing 122, similar to that shown in FIG. 1. It should be noted that one or more of the hinge assemblies 130 can be used for hinged or pivotal interconnection of a vanity door with a vanity housing similar to that shown in FIG. 2, as well as in other vehicular or non-vehicular applications.

The hinge assembly 130 includes one or more pivot bearing members 132 interconnected with the vanity door 124 and having open portions 134 for insertion of a pivot rod or pin (described below). A cam member 136 is also interconnected or integrally formed with the vanity door 124 and includes an open portion 138 for receiving a pivot rod or pin extending longitudinally between the pivot bearing members 132. The cam member 136 preferably includes one or more dwell portions 140 and 142 and a lobe portion 144. As perhaps best seen in FIGS. 9 through 14, the exemplary hinge assembly 130 is preferably composed of a molded synthetic or plastic material, and thus the cam member 136 can optionally be molded with a hollowed configuration, indicated by reference numeral 146. It should be noted that the various components of the hinge assembly 130 can alternately be composed of other suitable materials, and can be constructed by other methods, as will be appreciated by one skilled in the art.

The vanity housing 122 includes one or more stanchions 148 protruding in a generally lateral direction to support a pivot pin 150, which extends in a generally longitudinal direction. The pivot pin 150 is received within the open portions 134 and 138 of the pivot bearing members 132 and the cam member 136, respectively, in order to hingedly and pivotally interconnect the vanity door 124 with the vanity housing 122.

Preferably, especially where the various components of the hinge assembly 130 are composed of molded plastic or other synthetic materials, the pivot pin 150 may be laterally urged and "snapped" into place in a pivotal engagement with the pivot bearing members 132. Alternately, as will now be appreciated by one skilled in the art, other suitable retaining arrangements can be employed to retain the pivot pin in place in a pivotal engagement with the pivot bearing members 132. In this regard, it should further be noted that the single pivot pin 150 shown in the exemplary embodiments of the hinge assembly 130 depicted in the drawings can be replaced by two or more pivot pins, each of which being supported by one or more of the stanchions 148 or other similar pin support arrangements. Where a pair of pivot pins are disposed on opposite sides of the cam member 136 in lieu of the single pivot pin 150 shown in the drawings, the open portion 138 of the cam member 136 can be eliminated if desired.

The vanity housing 122 of the exemplary hinge assembly 130 also includes a pair of spring support members 152, each of which includes a spring set 154, and a pair of spring retainers 156 laterally spaced away from the spring seats 154 for receiving and slidably retaining a leaf spring 160 extending generally longitudinally therebetween. In the hinge assembly 130 depicted in the drawings, the leaf spring 160 is generally unsupported in a medial portion between the associated spring support members 152 and spring retainer members 156 at opposite ends of the leaf spring 160. Thus, when the hinge assembly 130 is assembled, the leaf spring 160 is slidably engaged and resiliently deflected by the cam member 136, and thus slides longitudinally outwardly against the spring seats 154, during pivotal rotational movement of the vanity door 124 relative to the vanity housing 122. The deflected leaf spring 160 exerts a resilient biasing force on the cam member 136 in a generally lateral direction, generally toward the longitudinal axis of rotation extending through the pivot pin 150.

As perhaps best seen in FIGS. 12 and 13, the leaf spring 160 tends to resiliently but releasably maintain the vanity door 124 in predetermined rotational orientations relative to the vanity housing 122 when the leaf spring 160 is engaged by the dwell portions 140 and 142 of the cam member 136. Conversely, because the laterally-enlarged lobe portion 144 of the cam member 136 has a generally rounded configuration confronting the leaf spring 160, the resilient biasing force of the leaf spring 160 tends to resiliently and forcibly urge or self-propel the vanity door 120 into one of such predetermined rotational orientations relative to the vanity housing 122 when the leaf spring 160 is engaged by the laterally-enlarged lobe portion. This effect results from the above-mentioned rounded configuration of the lobe portion 144 and from the fact that the leaf spring 160 is preferably resiliently deflected to a greater lateral extent when engaged by the lobe portion 144 than when engaged by either of the dwell portions 140 or 142.

As a result of the arrangement discussed above, when the vanity door 124 is manually rotated to rotational orientations in relatively close proximity to the predetermined relative rotational orientations corresponding to the positions of the dwell portions 140 and 142, the resilient biasing force of the leaf spring 160 tends to self-propel the vanity door portion into such predetermined relative rotational orientations. Although such relative rotational orientations correspond to open and closed positions of the vanity door 124 in the hinge assembly 130 depicted in the drawings, one skilled in the art will readily appreciate that the dwell portions of the cam member in any given application can be preselected to result in any number of other predetermined relative rotational orientations.

In addition to the above, it should also be noted that although the exemplary hinge assembly 130 depicted in the drawings includes the cam member 136 and the pivot bearing members 132 on the vanity door 124, with the pivot pin 150, the leaf spring 160, and their related supporting components on the vanity housing 122, one skilled in the art will readily appreciate that this arrangement can alternately be reversed. In such a reversed arrangement, the cam member 136 and the pivot bearing members 132 would be disposed on the vanity housing 122, while the pivot pin 150, the leaf spring 160, and their related components would then be disposed on the vanity door 124. For purposes of convenient reference and simplicity of the drawing figures, such reversed arrangement has not been explicitly shown in the drawings, but the configuration of the hinge components would be substantially identical to that shown in the drawings in connection with the exemplary hinge assembly 130.

The foregoing discussion discloses and describes exemplary embodiments of the present invention. One skilled in the art will readily recognize from such discussion and from the accompanying drawings and claims, that various changes, modifications, and variations may be made therein without departing from the spirit and scope of the invention as defined in the following claims.

I claim:

1. A spring-loaded hinge assembly for interconnecting an accessory door with an accessory housing structure for a vehicle, said hinge assembly comprising: pivot means pivotally interconnecting the door with the housing structure for rotational movement of the door relative to the housing structure about a longitudinally-extending axis; a cam member protruding in a generally lateral direction from the housing structure; resilient biasing means disposed on the door for rotational movement therewith, said resilient biasing means being slidably and resiliently deflectably engageable by said cam for exerting a resilient biasing force on said cam in a generally lateral direction generally toward said axis; and support means interconnected with the door for supporting said resilient biasing means in a direction generally opposite the direction of said engagement of said resilient biasing means by said cam, said support means including seat portions for slidably supporting said resilient biasing means at least at two spaced-apart locations thereon.

2. A hinge assembly according to claim 1, wherein said resilient biasing means comprises a leaf spring secured to the door, said leaf spring being laterally and resiliently deflected by said cam during at least a portion of said rotational movement of said door relative to the housing structure.

3. A hinge assembly according to claim 1, wherein said cam has at least one dwell portion thereon for engaging said resilient biasing means at a corresponding predetermined rotational orientation of the door relative to the housing structure, said resilient biasing means tending to resiliently and releasably maintains the door and the housing in said predetermined relative rotational orientation when engaged by said dwell portion of said cam.

4. A hinge assembly according to claim 3, wherein said cam includes a laterally-enlarged lobe portion disposed generally adjacent said dwell portion, said resilient biasing means being resiliently and generally laterally deflected by said cam to a greater extent when engaged by said laterally-enlarged lobe portion of said cam than when engaged by said dwell portion of said cam.

5. A hinge assembly according to claim 4, wherein said cam includes at least a pair of said dwell portions, and said laterally-enlarged lobe portion of said cam is disposed generally at the intersection of said dwell portions in order to cause said resilient biasing means to tend to forcibly urge the door into said predetermined relative rotational orientation relative to the housing structure when said resilient biasing means is engaged by said laterally-enlarged lobe portion.

6. A hinge assembly according to claim 4, wherein said cam includes at least a pair of said dwell portions thereon, said laterally-enlarged lobe portion being disposed between said dwell portions, said dwell portions engaging said resilient biasing means at a corresponding pair of said predetermined relative rotational orientations of the door and the housing structure, said resilient biasing means tending to resiliently and releasably maintain the door and the housing structure in each of said predetermined relative rotational orientations when engaged by the corresponding dwell portion of said cam.

7. A hinge assembly according to claim 6, wherein said resilient biasing means comprises a leaf spring secured to the door, said leaf spring being laterally and resiliently deflected by said cam during at least a portion of said rotational movement of the door relative to the housing structure.

8. A spring-loaded hinge assembly for interconnecting an accessory door with an accessory housing structure for a vehicle, said hinge assembly comprising: pivot means pivotally interconnecting the door with the housing structure for rotational movement of the door relative to the housing structure about a longitudinally-extending axis; a cam member protruding in a generally lateral direction from the door; resilient biasing means disposed on the housing structure for rotational movement therewith, said resilient biasing means being slidably and resiliently deflectably engageable by said cam for exerting a resilient biasing force of said cam in a generally lateral direction generally toward said axis; and support means interconnected with the housing structure for supporting said resilient biasing means in a direction generally opposite the direction of said engagement of said resilient biasing means by said cam, said support means including seat portions for slidably supporting said resilient biasing means at least at two spaced-apart locations thereon.

9. A hinge assembly according to claim 8, wherein said resilient biasing means comprises a leaf spring secured to the housing structure, said leaf spring being laterally and resiliently deflected by said cam during at least a portion of said rotational movement of said cam and the door relative to the housing structure.

10. A hinge assembly according to claim 8, wherein said cam has at least one dwell portion thereof for engaging said resilient biasing means at a corresponding predetermined rotational orientation of the door relative to the housing structure, said resilient biasing means tending to resiliently and releasably maintain the door and the housing in said predetermined relative rotational orientation when engaged by said dwell portion of said cam.

11. A hinge assembly according to claim 10, wherein said cam includes a laterally-enlarged lobe portion disposed generally adjacent said dwell portion, said resilient biasing means being resilient and generally laterally deflected by said cam to a greater extent when engaged by said laterally-enlarged lobe portion of said cam than when engaged by said dwell portion of said cam.

12. A hinge assembly according to claim 11, wherein said cam includes at least a pair of said dwell portions, and said laterally-enlarged lobe portion of said cam is disposed generally at the intersection of said dwell portions in order to cause said resilient biasing means to tend to forcibly urge the door into said predetermined relative rotational orientation relative to the housing structure when said resilient biasing means is engaged by said laterally-enlarged lobe portion.

13. A hinge assembly according to claim 11, wherein said cam includes at least a pair of said dwell portions thereon, said laterally-enlarged lobe portion being disposed between said dwell portions, said dwell portions engaging said resilient biasing means at a corresponding pair of said predetermined relative rotational orientations of the door and the housing structure, said resilient biasing means tending to resiliently and releasably maintain the door and the housing structure in each of said predetermined relative rotational orientations when engaged by the corresponding dwell portion of said cam.

14. A hinge assembly according to claim 13, wherein said resilient biasing means comprises a leaf spring secured to the housing structure, said leaf spring being laterally and resiliently deflected by said cam during at least a portion of said rotational movement of said cam and the door relative to the housing structure.

*15. A spring-loaded hinge assembly for interconnecting an accessory door with an accessory housing structure for a vehicle, said hinge assembly comprising: pivot means pivotally interconnecting the door with the housing structure for relative rotational movement of the door and the housing structure with respect to one another about a longitudinally-extending axis; a cam member protruding in a generally lateral direction from one of the door or the housing structure; resilient biasing means disposed on the other of the door or the housing structure, said resilient biasing means being resiliently deflectably engageable by said cam for exerting a resilient biasing force on said cam in a generally lateral direction generally toward said axis; and support means interconnected with one of the door or the housing structure for supporting said resilient biasing means in a direction generally opposite the direction of said engagement of said resilient biasing means by said cam, said support means including at least one seat portion for slidably supporting said resilient biasing means thereon.*

*16. A hinge assembly according to claim 15, wherein said resilient biasing means comprises a leaf spring, said leaf spring being laterally and resiliently deflected by said cam during at least a portion of said relative rotational movement of the door and the housing structure.*

*17. A hinge assembly according to claim 15, wherein said cam has at least one dwell portion thereon for engaging said resilient biasing means at a corresponding predetermined relative rotational orientation of the door and the housing structure, said resilient biasing means tending to resiliently and releasably maintain the door and the housing structure in said predetermined relative rotational orientation when engaged by said dwell portion of said cam.*

*18. A hinge assembly according to claim 17, wherein said cam includes a laterally-enlarged lobe portion disposed generally adjacent said dwell portion, said resilient biasing means being resiliently and generally laterally deflected by said cam to a greater extent when engaged by said laterally-enlarged lobe portion of said cam than when engaged by said dwell portion of said cam.*

*19. A hinge assembly according to claim 18, wherein said cam includes at least a pair of said dwell portions, and said laterally-enlarged lobe portion of said cam is disposed generally at the intersection of said dwell portions in order to cause said resilient biasing means to tend to forcibly urge the door and the housing structure into said predetermined relative rotational orientation when said resilient biasing means is engaged by said laterally-enlarged lobe portion.*

*20. A hinge assembly according to claim 18, wherein said cam includes at least a pair of said dwell portions thereon, said laterally-enlarged lobe portion being disposed between said dwell portions, said dwell portions engaging said resilient biasing means at a corresponding pair of said predetermined relative rotational orientations of the door and the housing structure, said resilient biasing means tending to resiliently and releasably maintain the door and the housing structure in each of said predetermined relative rotational orientations when engaged by the corresponding dwell portion of said cam.*

*21. A hinge assembly according to claim 20, wherein said resilient biasing means comprises a leaf spring, said leaf spring being laterally and resiliently deflected by said cam during at least a portion of said relative rotational movement of the door and the housing structure.*

* * * * *

UNITED STATES PATENT AND TRADEMARK OFFICE

CERTIFICATE OF CORRECTION

PATENT NO. : RE. 33,631

DATED : July 9, 1991

INVENTOR(S) : Lobanoff, et al

It is certified that error appears in the above-identified patent and that said Letters Patent is hereby corrected as shown below:

In the drawings, Sheet 1 of 2, should be sheet 1 of 4, and sheet 2 of 2 should be sheet 3 of 4.

In the drawings, Sheet 2 of 4, consisting of figs. 3-6 and sheet 4 of 4, consisting of figs. 9-14, should be added as shown on the attached pages.

UNITED STATES PATENT AND TRADEMARK OFFICE

CERTIFICATE OF CORRECTION

PATENT NO. : RE. 33,631

DATED : July 9, 1991

INVENTOR(S) : Lobanoff, et al

It is certified that error appears in the above-identified patent and that said Letters Patent is hereby corrected as shown below:

Title Page under U.S. Patent Documents, reference 3,305,679, "Barcita-Peruchina" should be --Barcita-Peruchena--.

Title Page under U.S. Patent Documents, reference to Viertel, et al, "4,203,194" should be --4,203,149--.

On the Title Page under "Foreign Patent Documents" reference 1,143,365, "Fed. Rep. of Germany" should be --France--.

Abstract line 3, "interconnecitng" should be --interconnecting--.

Column 8, line 30, Claim 3, "maintains" should be --maintain--.

Column 9, line 28, Claim 10, "thereof" should be --thereon--.

Column 9, line 39, Claim 11, "resilient" should be --resiliently--.

Signed and Sealed this

Second Day of March, 1993

*Attest:*

STEPHEN G. KUNIN

*Attesting Officer*

*Acting Commissioner of Patents and Trademarks*

FIG. 9.
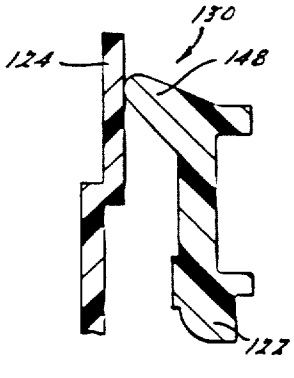
FIG. 10.
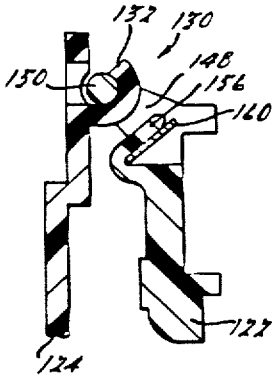
FIG. 11.
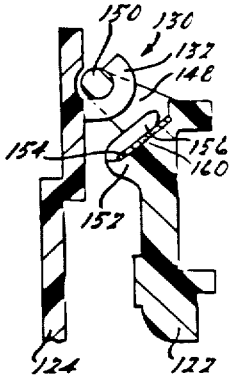
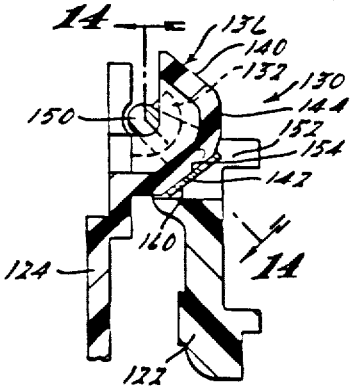
FIG. 12.
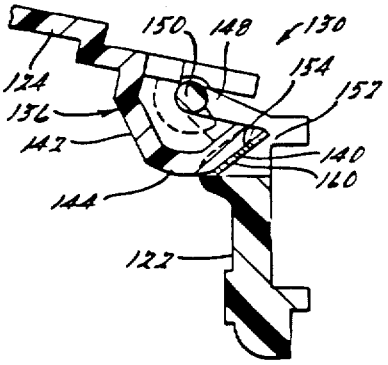
FIG. 13.
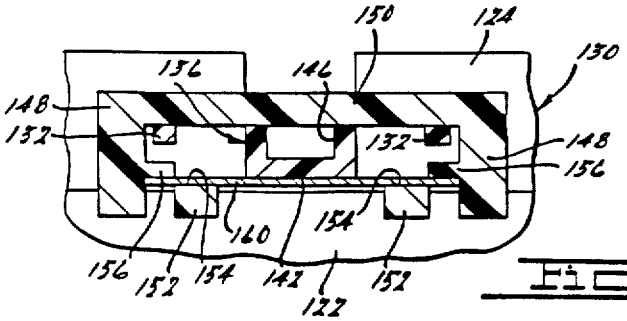
FIG. 14.